US012699255B2

(12) United States Patent     (10) Patent No.:   US 12,699,255 B2
Suenaga     (45) Date of Patent:     Aug. 4, 2026

(54) WIDE-ANGLE LENS

(71) Applicant: YOKOHAMA LEADING DESIGN LIMITED PARTNERSHIP COMPANY, Kanagawa (JP)

(72) Inventor: Yutaka Suenaga, Kanagawa (JP)

(73) Assignee: YOKOHAMA LEADING DESIGN LIMITED PARTNERSHIP COMPANY, Kanagawa (JP)

( * ) Notice: Subject to any disclaimer, the term of this patent is extended or adjusted under 35 U.S.C. 154(b) by 297 days.

(21) Appl. No.: 18/564,556

(22) PCT Filed: Jan. 9, 2023

(86) PCT No.: PCT/JP2023/000242
§ 371 (c)(1),
(2) Date: Nov. 27, 2023

(87) PCT Pub. No.: WO2023/166851
PCT Pub. Date: Sep. 7, 2023

(65) Prior Publication Data
US 2025/0085515 A1    Mar. 13, 2025

(30) Foreign Application Priority Data
Mar. 4, 2022    (JP) ................................. 2022-033818

(51) Int. Cl.
*G02B 13/00*      (2006.01)
*G02B 13/06*      (2006.01)

(52) U.S. Cl.
CPC ..... *G02B 13/0065* (2013.01); *G02B 13/0045* (2013.01); *G02B 13/007* (2013.01); *G02B 13/06* (2013.01)

(58) Field of Classification Search
CPC .......................... G02B 13/0065; G02B 13/007
(Continued)

(56) References Cited

U.S. PATENT DOCUMENTS

| | | | |
|---|---|---|---|
| 7,170,690 B2 | 1/2007 | Ophey | |
| 11,726,304 B2 * | 8/2023 | Saiga | ................... G02B 13/007 |
| | | | 359/717 |

(Continued)

FOREIGN PATENT DOCUMENTS

| | | |
|---|---|---|
| JP | 2005-181635 A | 7/2005 |
| JP | 2005-215165 A | 8/2005 |

(Continued)

OTHER PUBLICATIONS

European Patent Office, Extended European Search Report dated May 7, 2025 in European Patent Application No. 23763114.8, 8 pages.

(Continued)

*Primary Examiner* — Darryl J Collins

(74) *Attorney, Agent, or Firm* — MASUVALLEY & PARTNERS; Peter Martinez

(57) ABSTRACT

The wide-angle lens consists of a first lens group, a second lens group including an optical element, a third lens group comprising up to two lenses having a positive refractive power and a fourth lens group comprising one lens having a negative refractive power in order of an optical path from an object side, wherein the first lens group includes a meniscus lens having a negative refractive power and a convex surface facing the object side, the optical element has, in the order of the optical path, a first optical surface that is convex toward the object side, a second optical surface that bends the optical path from the first optical surface and a third optical surface that is concave toward the object side, and the first optical surface, the second optical surface and the third optical surface are integrally molded and have six or more aspherical surfaces in total.

7 Claims, 7 Drawing Sheets

(58) Field of Classification Search
USPC ......................................................... 359/737
See application file for complete search history.

(56) References Cited

U.S. PATENT DOCUMENTS

| | | | |
|---|---|---|---|
| 2006/0061871 A1 | 3/2006 | Ophey | |
| 2007/0008418 A1 | 1/2007 | Kuroda et al. | |
| 2008/0062538 A1 | 3/2008 | Liao | |
| 2009/0052052 A1 | 2/2009 | Yamano | |
| 2016/0231539 A1* | 8/2016 | Huang | G02B 13/008 |
| 2018/0348485 A1* | 12/2018 | Shi | G02B 27/0025 |
| 2020/0064527 A1* | 2/2020 | Shigemitsu | G02B 7/1805 |
| 2021/0333515 A1* | 10/2021 | Li | G02B 13/0045 |

FOREIGN PATENT DOCUMENTS

| | | | |
|---|---|---|---|
| JP | 2006-505820 A | 2/2006 | |
| JP | 5226888 B2 | 7/2013 | |
| KR | 200384094 Y1 | 5/2005 | |
| KR | 20100049872 A | 5/2010 | |
| WO | WO2022/226957 A1 | 11/2022 | |

OTHER PUBLICATIONS

Korean Intellectual Property Office, Notice of Preliminary Rejection with English Translation dated May 28, 2025 in Korean Patent Application No. 10-2023-7040833, 11 pages.

WIPO, Japan Patent Office International Search Authority, International Search Report (with English translation) and Written Opinion mailed Mar. 7, 2023 in International Patent Application No. PCT/JP2023/000242, 10 pages.

* cited by examiner

[FIG. 1]
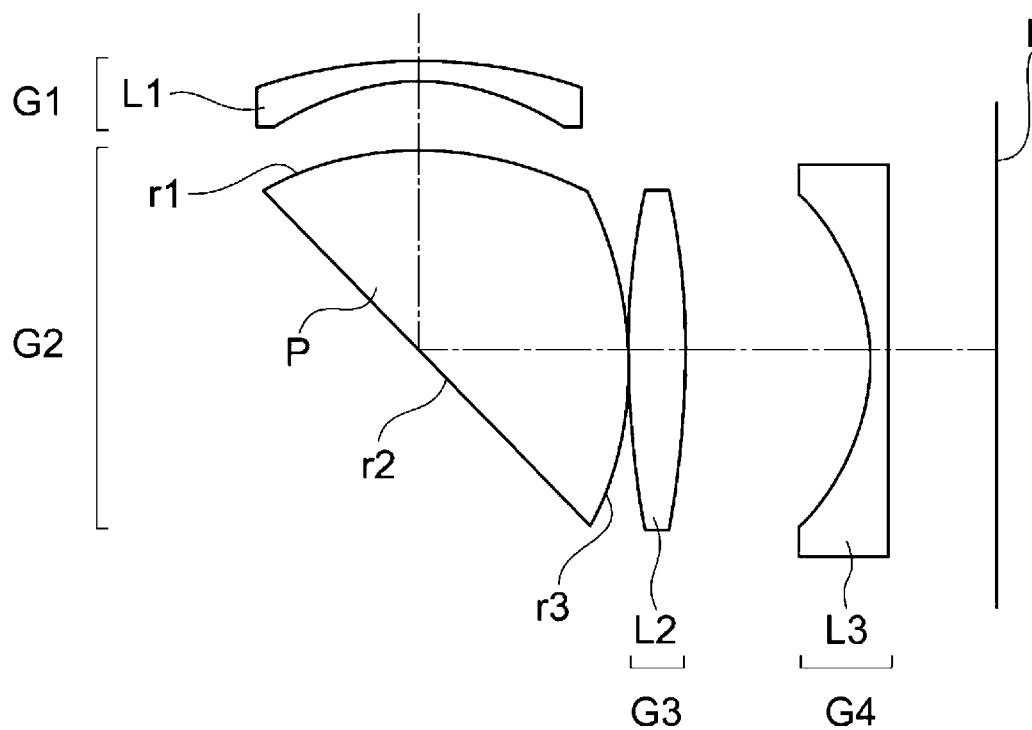

[FIG. 2]
Example 1
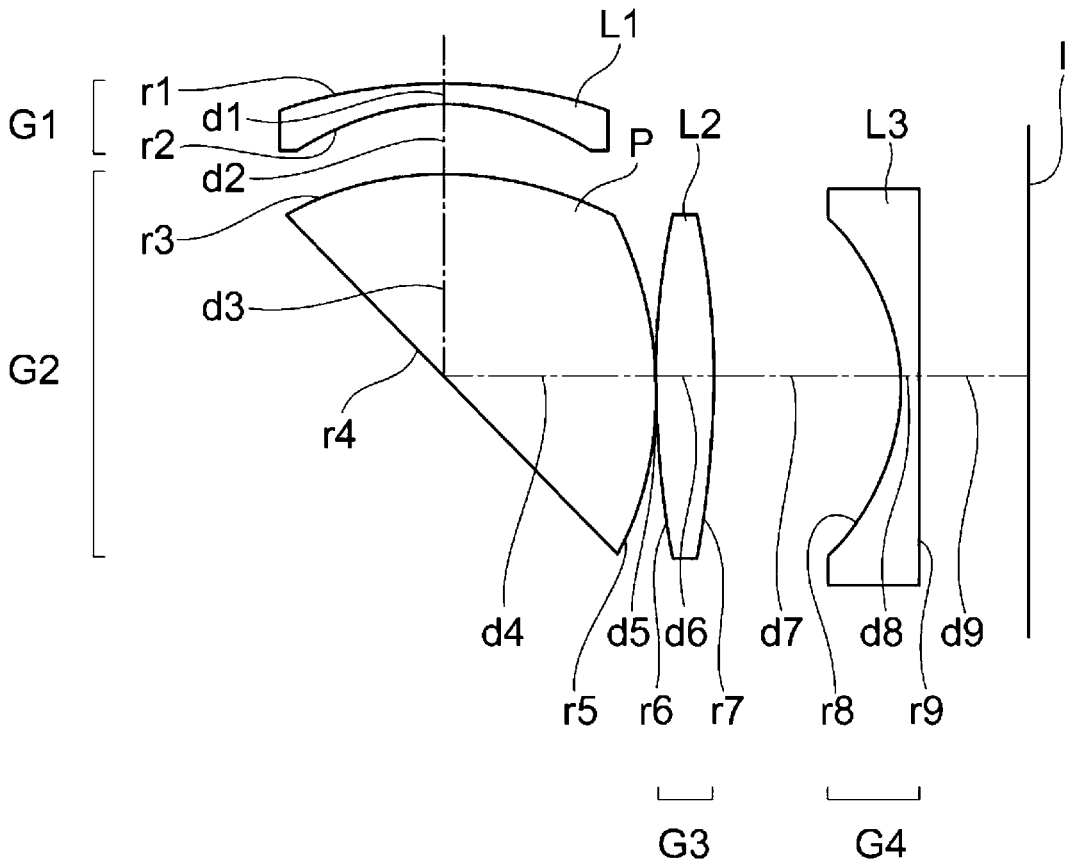

[FIG. 3]
Example 1     (a)            (b)
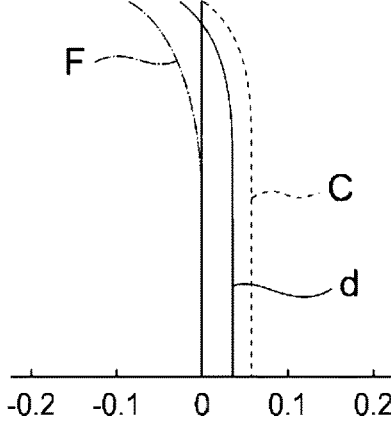 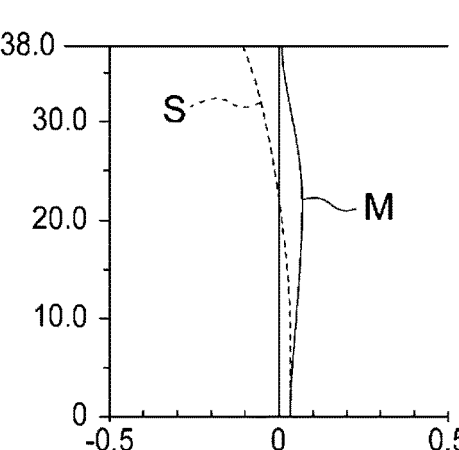
(c)                       (d)
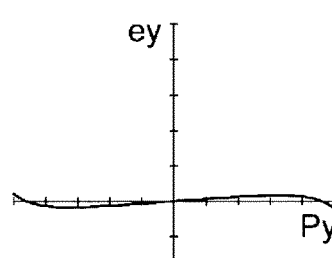 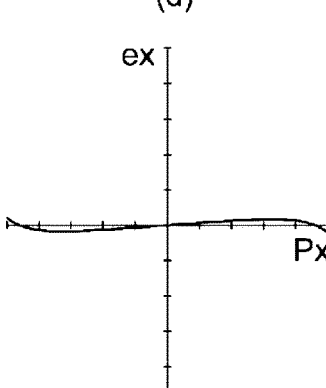
(e)                       (f)
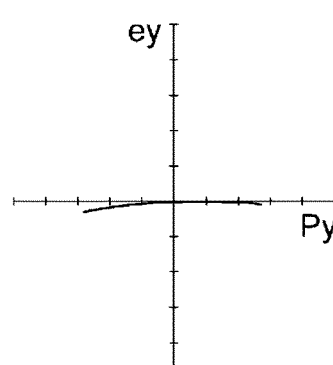 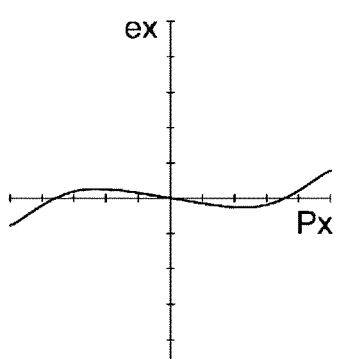

[FIG. 4]
Example 2
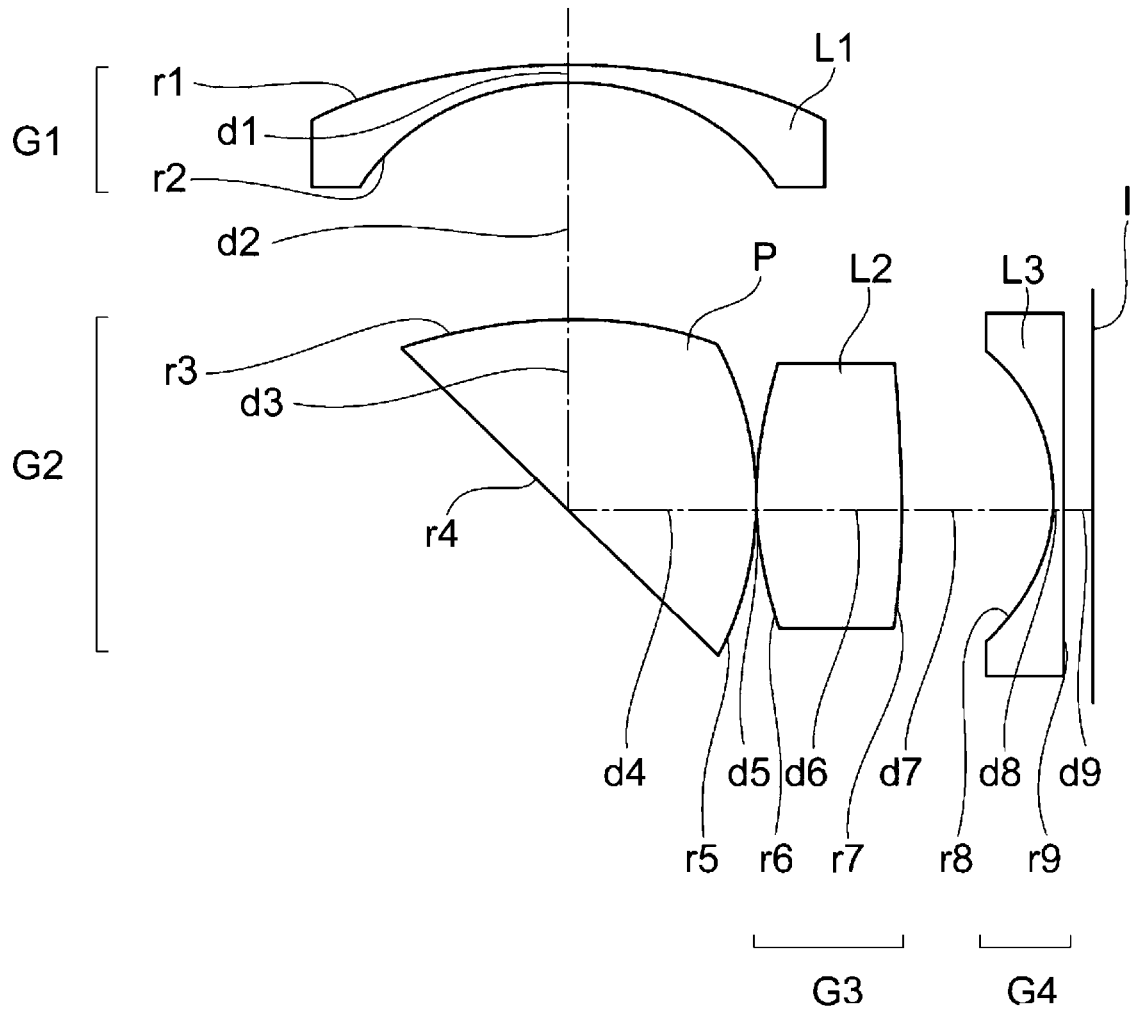

[FIG. 5]
Example 2     (a)                 (b)
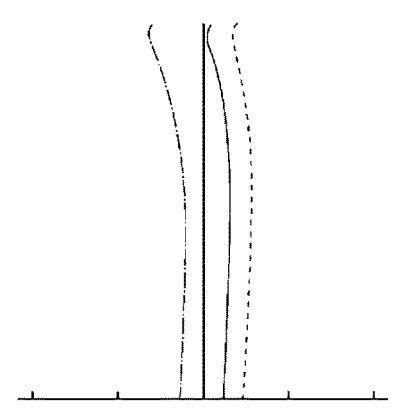 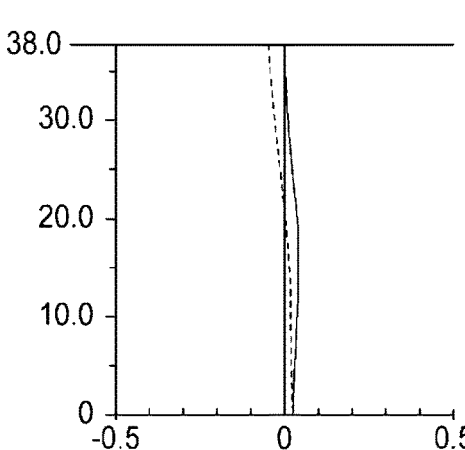
(c)                              (d)
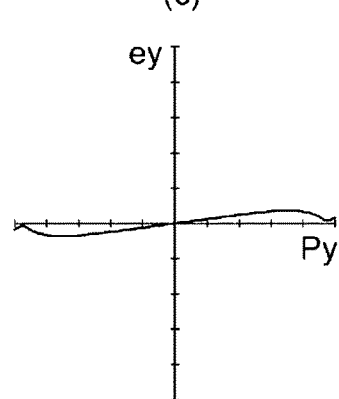 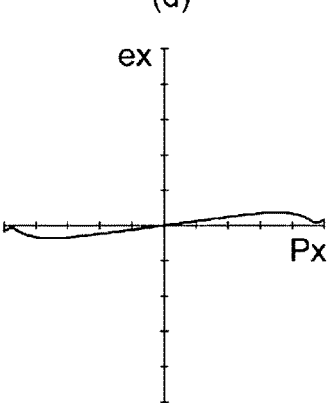
(e)                              (f)
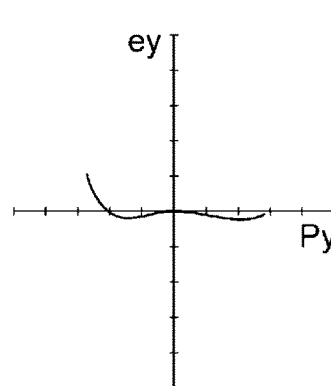 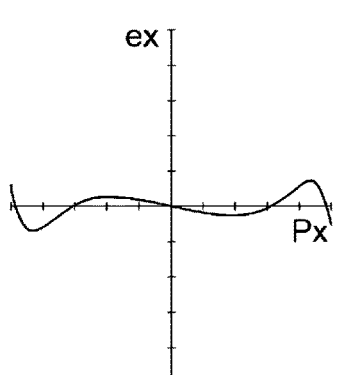

[FIG. 6]
Example 3
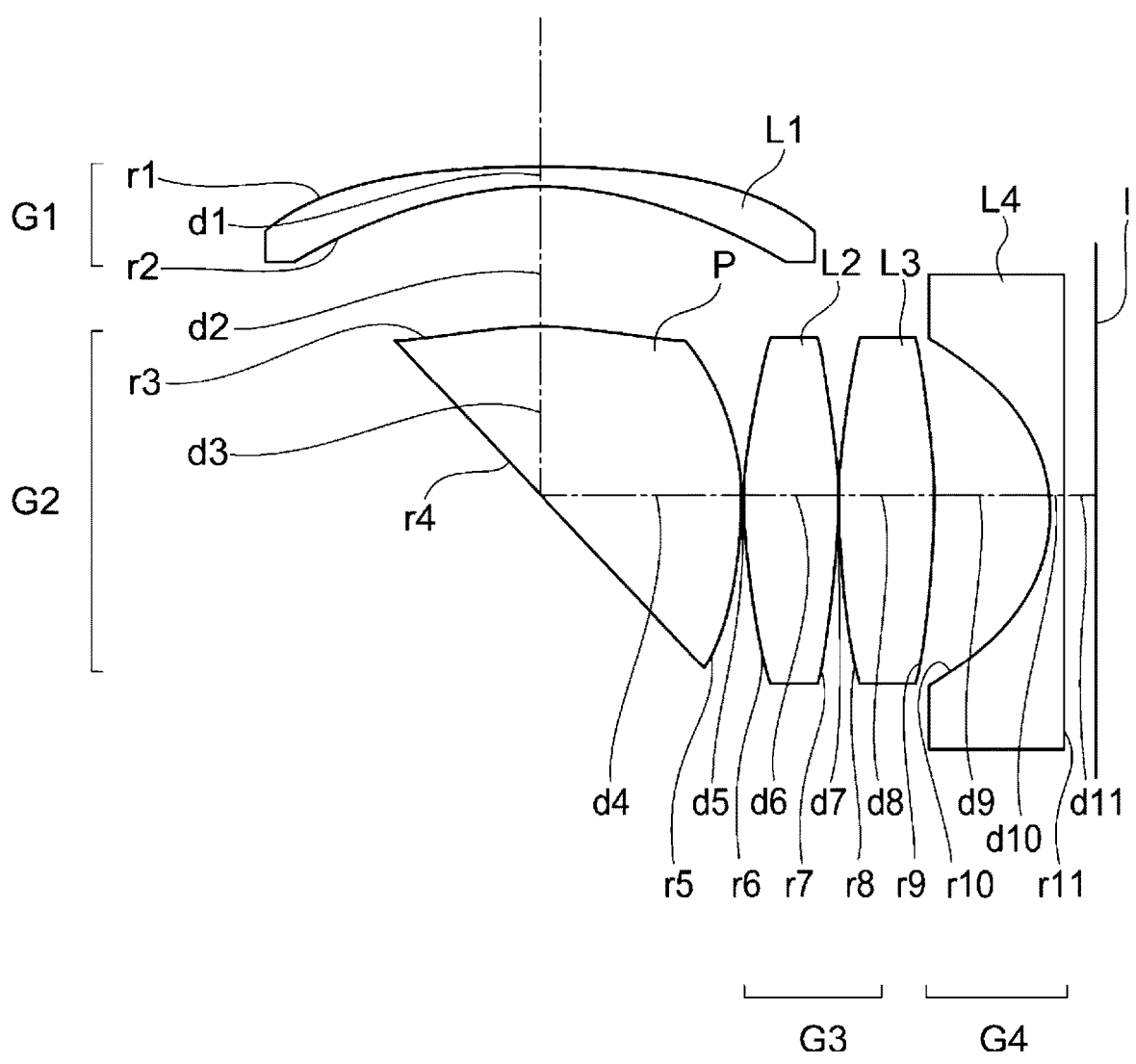

[FIG. 7]
Example 3     (a)                                 (b)
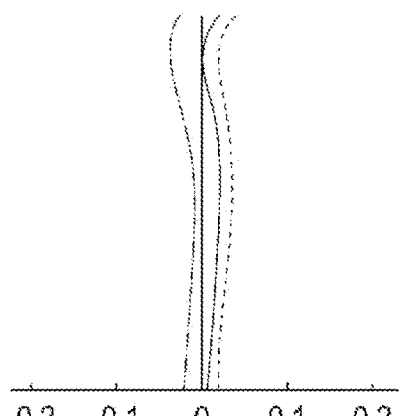
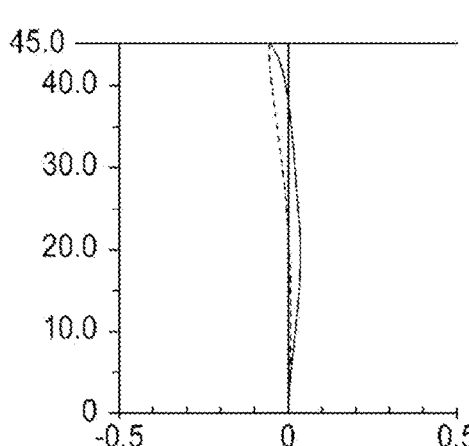
(c)                                        (d)
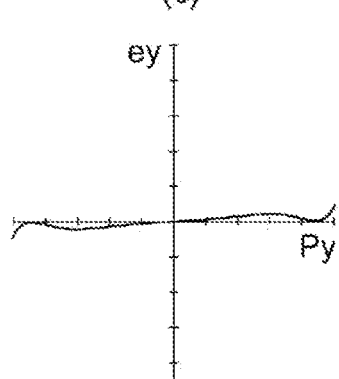
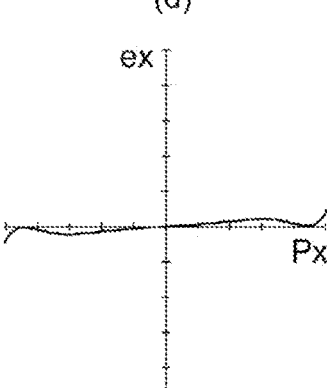
(e)                                        (f)
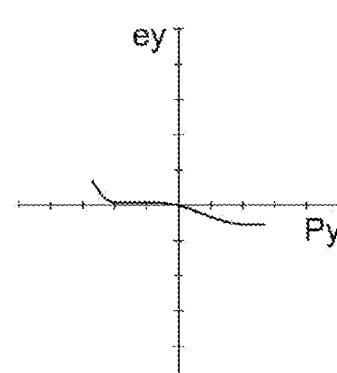
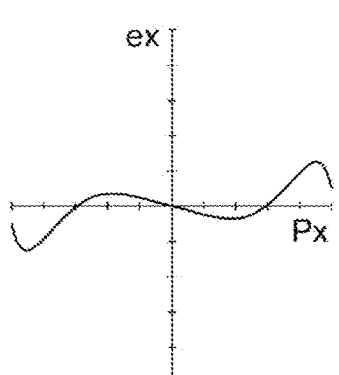

WIDE-ANGLE LENS

RELATED APPLICATIONS

This application is the U.S. National Phase of and claims priority to International Patent Application No. PCT/JP2023/000242, International Filing Date Jan. 9, 2023, entitled Wide-Angle Lens; which claims benefit of Japanese Patent Application No. JP2022-033818 filed Mar. 4, 2022; both of which are incorporated herein by reference in their entireties.

TECHNICAL FIELD

The present invention relates to a wide-angle lens.

BACKGROUND ART

Compact optical systems are disclosed in Patent Document 1 and Patent Document 2. In these optical systems, an optical path is bent by an optical element placed in the optical path. As a result, an optical path on an object side of the optical element (hereinafter referred to as "object-side optical path") and an optical path on an image side of the optical element (hereinafter referred to as "image-side optical path") are formed.

RELATED ART DOCUMENT

Patent Document

Patent Document 1: JP-A 2005-181635
Patent Document 2: JP-A 2005-215165

SUMMARY OF THE INVENTION

Problems to be Solved by the Invention

In the optical system described above, a length of the object-side optical path is sufficiently short. However, a length of the image-side optical path cannot be said to be sufficiently short.

The present invention has been made in view of such circumstances. That is, an object of the present invention is to provide a wide-angle lens that has high imaging performance and has a sufficiently short length of not only the object-side optical path but also the image-side optical path.

Means for Solving the Problems

In order to solve the above-mentioned problem and achieve the above object, an aspect of the wide-angle lens of the present invention consists of a first lens group comprising a lens having a negative refractive power as a whole, a second lens group including an optical element, a third lens group comprising up to two lenses having a positive refractive power and a fourth lens group comprising one lens having a negative refractive power in order of an optical path from an object side, wherein the first lens group includes a meniscus lens having a negative refractive power and a convex surface facing the object side, the optical element has, in the order of the optical path, a first optical surface that is convex toward the object side, a second optical surface that bends the optical path from the first optical surface and a third optical surface that is concave toward the object side, and the first optical surface, the second optical surface and the third optical surface are integrally molded and have six or more aspherical surfaces in total.

In order to achieve the above object, in an aspect of the wide-angle lens of the present invention, the first lens group consists of the meniscus lens having the negative refractive power having the convex surface facing the object side.

In order to achieve the above object, in an aspect of the wide-angle lens of the present invention, the four or more aspherical surfaces are rotationally symmetrical aspherical surfaces.

In order to achieve the above object, in an aspect of the wide-angle lens of the present invention, all lenses and the optical element constituting each lens group are made of plastic.

In order to achieve the above object, an aspect of the wide-angle lens of the present invention satisfies the following conditional expression (1).

$$0.35 < f/(FNo \times d2) < 1.0 \tag{1}$$

Here,
f is a focal length of the entire wide-angle lens,
FNo is an F number of the wide-angle lens, and
d2 is a thickness of the entire second lens group on an optical axis.

In order to achieve the above object, an aspect of the wide-angle lens of the present invention satisfies the following conditional expressions (2) and (3).

$$0.9 < R1/f < 2.1 \tag{2}$$

$$-1.9 < R2/f < -0.9 \tag{3}$$

here,
R1 is a radius of curvature of an object side surface of the second lens group,
R2 is a radius of curvature of an image side surface of the second lens group, and
f is the focal length of the entire wide-angle lens.

In order to achieve the above object, an aspect of the wide-angle lens of the present invention satisfies the following conditional expression (4).

$$-0.55 < f/fL1 < -0.15 \tag{4}$$

here,
f is the focal length of the entire wide-angle lens, and
fL1 is a focal length of the first lens group.

In order to achieve the above object, an aspect of the wide-angle lens of the present invention satisfies the following conditional expression (5).

$$-0.80 < f/fL4 < -0.15 \tag{5}$$

here,
f is the focal length of the entire wide-angle lens, and
fL4 is a focal length of the fourth lens group.

Effects of the Invention

According to the wide-angle lens according to the present invention, it is possible to provide a wide-angle lens that has high imaging performance and has a sufficiently short length of not only the object-side optical path but also the image-side optical path.

BRIEF DESCRIPTION OF THE DRAWINGS

FIG. 1 is a cross-sectional view of the wide-angle lens according to the present embodiment.

FIG. 2 is a cross-sectional view of the wide-angle lens according to Example 1.

FIG. 3 is an aberration diagram of the wide-angle lens according to Example 1.

FIG. 4 is a cross-sectional view of the wide-angle lens according to Example 2.

FIG. 5 is an aberration diagram of the wide-angle lens according to Example 2.

FIG. 6 is a cross-sectional view of the wide-angle lens according to Example 3.

FIG. 7 is an aberration diagram of the wide-angle lens according to Example 3.

MODE FOR CARRYING OUT THE INVENTION

A wide-angle lens of the present embodiment consists of a first lens group comprising a lens having a negative refractive power as a whole, a second lens group including an optical element, a third lens group comprising up to two lenses having a positive refractive power and a fourth lens group comprising one lens having a negative refractive power in order of an optical path from an object side, wherein the first lens group includes a meniscus lens having a negative refractive power and a convex surface facing the object side, the optical element has, in the order of the optical path, a first optical surface that is convex toward the object side, a second optical surface that bends the optical path from the first optical surface and a third optical surface that is concave toward the object side, and the first optical surface, the second optical surface and the third optical surface are integrally molded and have six or more aspherical surfaces in total.

FIG. 1 is a cross-sectional view of the wide-angle lens according to the present embodiment. The wide-angle lens consists of the first lens group G1, the second lens group G2, the third lens group G3 and the fourth lens group G4. In the wide-angle lens of this embodiment, an optical image of an object is formed on an image plane I by the four lens groups.

The first lens group G1 comprises a lens having a negative refractive power as a whole and includes a meniscus lens having a negative refractive power. In the wide-angle lens of this embodiment, the first lens group G1 consists of a meniscus lens L1 having a negative refractive power and a convex surface facing the object side. Therefore, the first lens group G1 can have the negative refractive power.

The second lens group G2 includes an optical element P. In the wide-angle lens of this embodiment, the second lens group G2 consists of the optical element P.

The optical element P has a first optical surface r1, a second optical surface r2 and a third optical surface r3 in the order of the optical path. Light is refracted at the first optical surface r1 and the third optical surface r3. The light is reflected at the second optical surface r2.

The second optical surface r2 is a flat surface and functions as a reflective surface. Therefore, the optical path from the first optical surface r1 is bent at the second optical surface r2. An object-side optical path and an image-side optical path are formed. Only the first lens group G1 is disposed closer to the object side than the optical element P.

Therefore, a length of the object-side optical path can be shortened. That is, a thickness of the second lens group G2 can be reduced in a direction along the object-side optical path. As a result, the optical system can be made smaller.

The first optical surface r1 is a convex surface toward the object side, and the third optical surface r3 is a concave surface toward the object side. Therefore, the optical element P can have the positive refractive power. As a result, the second lens group G2 can have the positive refractive power.

As described above, the first lens group G1 can have the negative refractive power. When the second lens group G2 can have the negative refractive power, the refractive powers are arranged in order from the object side: the negative refractive power and the positive refractive power. In this case, the first lens group G1 and the second lens group G2 form a retrofocus type optical system.

The retrofocus type optical system has a wide angle of view and a long back focus. Therefore, even with the wide-angle lens of this embodiment, the wide angle of view and the sufficiently long back focus can be easily ensured.

When the sufficient back focus can be secured, a wide space is formed on the image side of the second lens group G2. Therefore, the third lens group G3 and the fourth lens group G4 can be arranged in this space.

The third lens group G3 comprises up to two lenses having a positive refractive power, and the fourth lens group G4 comprises one lens having a negative refractive power. In this case, since the total number of lenses used in the third lens group G3 and fourth lens group G4 is within three, it is possible to reduce a thickness of the third lens group G3 and a thickness of the fourth lens group G4. Since the third lens group G3 and the fourth lens group G4 are arranged closer to the image side than the optical element P, a length of the image-side optical path can be shortened.

In the wide-angle lens of this embodiment, the third lens group G3 consists of a biconvex lens L2, and the fourth lens group G4 consists of a meniscus lens L3 having a negative refractive power and a convex surface facing the image side. Since the total number of lenses used in the third lens group G3 and fourth lens group G4 is two, the length of the image-side optical path can be shortened.

Since the lens having the positive refractive power and the lens having the negative refractive power are arranged on the image side of the second lens group, chromatic aberration can be favorably corrected. In the wide-angle lens of this embodiment, the chromatic aberration can be favorably corrected by the biconvex lens L2 and the meniscus lens L3 having the negative refractive power.

The optical element P can be formed of a colorless and transparent material. Glass or resin can be used as the colorless and transparent material.

As described above, in the optical element P, the second optical surface r2 functions as a reflective surface. When using total reflection, a surface of the material may be used as it is as the second optical surface r2. If the total reflection is not used, a reflective film may be formed on the surface of the material and this surface may be used as the second optical surface r2.

The optical element P is preferably formed singly. In this case, the first optical surface r1, the second optical surface r2 and the third optical surface r3 are integrally molded. When the three optical surfaces are integrally molded, an increase in eccentricity occurring at the first optical surface r1 and the second optical surface r2, an increase in eccentricity occurring at the first optical surface r1 and the third optical surface r3 and an increase in eccentricity occurring at the second optical surface r2 and the third optical surface r3 can be suppressed. As a result, deterioration in imaging performance due to eccentricity can be prevented.

The wide-angle lens of this embodiment has six or more aspherical surfaces in total. By using six or more aspherical surfaces, high imaging performance can be ensured.

The aspherical surface can be a rotationally symmetrical surface with an optical axis as a rotation axis. By making the surface rotationally symmetrical, the lens surface can be formed with high precision. As a result, high imaging performance can be ensured. Furthermore, the manufacturing cost of the optical system can be reduced.

The aperture diaphragm can be arranged between the first lens group G1 and the second lens group G2, or between the second lens group G2 and the third lens group G3.

In the wide-angle lens of this embodiment, the first lens group consists of the meniscus lens having the negative refractive power and the convex surface facing the object side.

Since the first lens group consists of the meniscus lenses, even if the first lens group has a large refractive power, the refractive power can be dispersed. Therefore, occurrence of aberration can be suppressed. Further, when there is only one meniscus lens, a thickness of the first lens group can be reduced. As a result, the optical system can be made smaller.

In the wide-angle lens of this embodiment, the four or more aspherical surfaces are rotationally symmetric aspherical surfaces.

By using the rotationally symmetric aspherical surface, high imaging performance can be ensured. The rotationally symmetric aspherical surface can be a surface without an inflection point. By doing so, a highly accurate lens surface can be obtained. Therefore, the manufacturing cost of the optical system can be reduced.

In the wide-angle lens of this embodiment, an aspherical surface and a spherical surface can be combined. Two spherical surfaces can be used. From the viewpoint of the manufacturing cost, it is preferable that the aspherical surface has no inflection point. However, from the viewpoint of ensuring higher imaging performance, it is permissible to use an aspherical surface with an inflection point.

In the wide-angle lens of this embodiment, all lenses and the optical element constituting each lens group are made of plastic.

By making the lenses and optical element made of plastic, the optical system can be made lightweight and the manufacturing cost of the optical system can be reduced.

The wide-angle lens of this embodiment satisfies the following conditional expression (1).

$$0.35 < f/(FNo \times d2) < 1.0 \tag{1}$$

Here,
f is a focal length of the entire wide-angle lens,
FNo is an F number of the wide-angle lens, and
d2 is a thickness of the entire second lens group on an optical axis.

If it is smaller than the lower limit of the conditional expression (1), the size of the entire optical system will increase. If it is larger than the upper limit of the conditional expression (1), it becomes difficult to bend the optical path.

The wide-angle lens of this embodiment satisfies the following conditional expressions (2) and (3).

$$0.9 < R1/f < 2.1 \tag{2}$$

$$-1.9 < R2/f < -0.9 \tag{3}$$

here,
R1 is a radius of curvature of an object side surface of the second lens group,
R2 is a radius of curvature of an image side surface of the second lens group, and
f is the focal length of the entire wide-angle lens.

If it is smaller than the lower limit of the conditional expression (2), a large amount of negative spherical aberration occurs, making it difficult to correct. If it is larger than the upper limit of the conditional expression (2), a positive spherical aberration caused by the first lens group cannot be canceled out, so that the spherical aberration worsens.

If it is smaller than the lower limit of the conditional expression (3), a large amount of spherical aberration occurs, making it difficult to correct. If it is larger than the upper limit of the conditional expression (3), the positive spherical aberration caused by the fourth lens group cannot be canceled out, so that the spherical aberration worsens.

The wide-angle lens of this embodiment satisfies the following conditional expression (4).

$$-0.55 < f/fL1 < -0.15 \tag{4}$$

here,
f is the focal length of the entire wide-angle lens, and
fL1 is a focal length of the first lens group.

If it is smaller than the lower limit of the conditional expression (4), the spherical aberration worsens and at the same time the length of the entire optical system becomes too long. If it is larger than the upper limit of the conditional expression (4), an effect of retrofocus will be weakened, and the aberration of image height at a large angle of view will worsen.

The wide-angle lens of this embodiment satisfies the following conditional expression (5).

$$-0.80 < f/fL4 < -0.15 \tag{5}$$

here,
f is the focal length of the entire wide-angle lens, and
fL4 is a focal length of the fourth lens group.

If it is smaller than the lower limit of the conditional expression (5), balance with a coma aberration generated in the first lens group will be lost, resulting in worsening of the coma aberration. If it is larger than the upper limit of the conditional expression (5), the balance with the coma aberration generated in the first lens group will be lost, and the coma aberration will worsen.

Examples of the wide-angle lenses will be described based on the drawings. However, the present invention is not limited to these examples.

Aberration diagrams of the examples will be described. FIGS. 3(a), 5(a) and 7(a) are diagrams showing spherical aberration. In the spherical aberration diagram, a vertical axis shows a relative incident height, and a horizontal axis shows an amount of aberration. In these figures, F indicates F line (wavelength 486 nm), d indicates d line (wavelength 588 nm), and C indicates C line (wavelength 656 nm).

FIGS. 3(b), 5(b) and 7(b) are diagrams showing astigmatism. In the astigmatism diagram, a vertical axis shows an incident angle (half angle of view) of a main light beam from the object side, and a horizontal axis shows an amount of aberration. A solid line indicates aberration of a meridional image surface M, and a dotted line indicates aberration of the sagittal image surface S.

FIGS. 3(c), 3(d), 5(c), 5(d), 7(c) and 7(d) show coma aberration when the incident angle is 0°. FIGS. 3(c), 5(c) and 7(c) show coma aberration in the meridional direction. FIGS. 3(d), 5(d) and 7(d) show coma aberration in the sagittal direction.

FIGS. 3(e), 3(f), 5(e), 5(f), 7(e) and 7(f) show the coma aberration when the incident angle is 38°. FIGS. 3(e), 5(e) and 7(e) show the coma aberration in the meridional direction. FIGS. 3(f), 5(f) and 7(f) show coma aberration in the sagittal direction.

In the coma aberration diagram, a vertical axis shows an amount of aberration, and a horizontal axis shows a distance.

Example 1

The wide-angle lens of Example 1 will be described using FIGS. 2 and 3. FIG. 2 is a diagram showing the wide-angle lens according to Example 1 of the present invention. FIG. 3 is an aberration diagram of the wide-angle lens according to Example 1 of the present invention.

The wide-angle lens of Example 1 includes, in order of the optical path from the object side, the first lens group G1 having the negative refractive power, the second lens group G2 having the positive refractive power, the third lens group G3 having the positive refractive power and the fourth lens group G4 having the negative refractive power.

The first lens group G1 includes a meniscus lens L1 having the negative refractive power and the convex surface facing the object side. The second lens group G2 includes the optical element P. The third lens group G3 includes a biconvex lens L2. The fourth lens group G4 includes a meniscus lens L3 having the negative refractive power and the convex surface facing the image side.

The optical element P is made of resin. The optical element P has the first optical surface, the second optical surface and the third optical surface. The first optical surface is shown as r3, the second optical surface is shown as r4, and the third optical surface is shown as r5.

The first optical surface is a surface that is convex toward the object side. The second optical surface is a flat surface. The third optical surface is a surface that is concave toward the object side. At the second optical surface, the light is reflected by total reflection.

Aspherical surfaces are provided on both surfaces of the meniscus lens L1, on both surfaces of the biconvex lens L2, and on both surfaces of the meniscus lens L3. All aspheric surfaces are rotationally symmetric aspherical surfaces.

Example 2

The wide-angle lens of Example 2 will be described using FIGS. 4 and 5. FIG. 4 is a diagram showing the wide-angle lens according to Example 2 of the present invention. FIG. 5 is an aberration diagram of the wide-angle lens according to Example 2 of the present invention.

The wide-angle lens of Example 2 includes, in order of the optical path from the object side, the first lens group G1 having the negative refractive power, the second lens group G2 having the positive refractive power, the third lens group G3 having the positive refractive power and the fourth lens group G4 having the negative refractive power.

The first lens group G1 includes a meniscus lens L1 having the negative refractive power and the convex surface facing the object side. The second lens group G2 includes the optical element P. The third lens group G3 includes a biconvex lens L2. The fourth lens group G4 includes a meniscus lens L3 having the negative refractive power and the convex surface facing the image side.

The optical element P is made of resin. The optical element P has the first optical surface, the second optical surface and the third optical surface. The first optical surface is shown as r3, the second optical surface is shown as r4, and the third optical surface is shown as r5.

The first optical surface is a surface that is convex toward the object side. The second optical surface is a flat surface. The third optical surface is a surface that is concave toward the object side. At the second optical surface, the light is reflected by total reflection.

Aspherical surfaces are provided on both surfaces of the meniscus lens L1, on both surfaces of the biconvex lens L2, and on both surfaces of the meniscus lens L3. All aspheric surfaces are rotationally symmetric aspherical surfaces.

Example 3

The wide-angle lens of Example 3 will be described using FIGS. 6 and 7. FIG. 6 is a diagram showing the wide-angle lens according to Example 3 of the present invention. FIG. 7 is an aberration diagram of the wide-angle lens according to Example 3 of the present invention.

The wide-angle lens of Example 3 includes, in order of the optical path from the object side, the first lens group G1 having the negative refractive power, the second lens group G2 having the positive refractive power, the third lens group G3 having the positive refractive power and the fourth lens group G4 having the negative refractive power.

The first lens group G1 includes a meniscus lens L1 having the negative refractive power and the convex surface facing the object side. The second lens group G2 includes the optical element P. The third lens group G3 includes a biconvex lens L2 and a biconvex lens L3. The fourth lens group G4 includes a meniscus lens L4 having the negative refractive power and the convex surface facing the image side.

The optical element P is made of resin. The optical element P has the first optical surface, the second optical surface and the third optical surface. The first optical surface is shown as r3, the second optical surface is shown as r4, and the third optical surface is shown as r5.

The first optical surface is a surface that is convex toward the object side. The second optical surface is a flat surface. The third optical surface is a surface that is concave toward the object side. At the second optical surface, the light is reflected by total reflection.

Aspherical surfaces are provided on both surfaces of the meniscus lens L1, on both surfaces of the biconvex lens L2, on both surfaces of the biconvex lens L3, and on both surfaces of the meniscus lens L4. All aspheric surfaces are rotationally symmetric aspherical surfaces.

Data of Example 1 is shown below. The table shows, from a left side, a surface number, radius of curvature (r), a distance between surfaces (d), a refractive index at a wavelength of 588 nm (nd) and Abbe number (vd). * mark indicates an aspherical surface.

The unit of the radius of curvature r, the distance between surfaces d, and other lengths is "mm". However, since the optical system can obtain the same optical performance even when proportionally enlarged or reduced, the unit is not limited to "mm".

When a height in the direction perpendicular to the optical axis is r, an amount of displacement in the optical axis direction at the height r is z(r), a curvature is C, a conic coefficient is k, and an aspheric coefficient is A0, A2, A4, A6, A8, A10, . . . , an aspherical shape is expressed by the following formula.

$$z(r) = (cr2)/\left[1 + \{1 - (1 + k)c2r2\}1/2\right] + A0 + A2r2 + A4r4 + A6r6 +$$

$$A8r8 + A10r10 + \dots$$

When a value of coordinates in a Y direction is y and a value of the coordinates in a X direction is x, r is expressed by the following formula.

$$R = \{x2 + y2\}1/2$$

The Y direction is a direction perpendicular to the optical axis. The X direction is a direction perpendicular to both the optical axis direction and the Y direction.

Furthermore, in the aspheric coefficient, "E-n" (n is an integer) indicates "10-n".

Numerical Example 1

| Unit: mm | | | | |
|---|---|---|---|---|
| Surface data | | | | |
| Surface number | r | d | nd | vd |
| 1* | 5.420 | 0.250 | 1.59 | 29.9 |
| 2* | 2.940 | 0.756 | | |
| 3* | 3.799 | 2.400 | 1.53 | 57.1 |
| 4 | ∞ | 2.490 | 1.53 | 57.1 |
| 5* | −4.818 | 0.050 | | |
| 6* | 10.826 | 0.620 | 1.53 | 57.1 |
| 7* | −10.131 | 2.186 | | |
| 8* | −2.576 | 0.200 | 1.59 | 29.9 |
| 9* | −550.423 | 1.225 | | |
| Image plane | ∞ | | | |

Aspheric data

1st surface
k = 0.000
A2 = 0.000, A4 = −1.142E−03, A6 = −1.449E−04, A8 = −3.122E−05, A10 = −7.554E−06
2nd surface
k = 0.000
A2 = 0.000, A4 = 9.505E−04, A6 = −1.613E−04, A8 = 2.222E−04, A10 = −7.094E−05
3rd surface
k = −0.015
A2 = 0.000, A4 = −9.163E−04, A6 = 3.036E−05, A8 = 1.092E−05, A10 = −7.252E−06
5th surface
k = −0.013
A2 = 0.000, A4 = −9.151E−04, A6 = −6.432E−05, A8 = −2.004E−07, A10 = 1.451E−06
6th surface
k = 0.000
A2 = 0.000, A4 = −3.856E−04, A6 = 2.223E−06, A8 = −2.815E−06, A10 = −1.213E−06
7th surface
k = 0.000
A2 = 0.000, A4 = 1.273E−03 A6 = −4.842E−05, A8 = −6.390E−06, A10 = 5.598E−07
8th surface
k = −0.305
A2 = 0.000, A4 = −9.492E−04, A6 = 1.588E−04, A8 = 2.572E−05, A10 = 3.154E−06
9th surface
k = 0.000, A2 = 0.000, A4 = 1.459E−05, A6 = 1.345E−07, A8 = −2.896E−08, A10 = −5.196E−09

| Various data | |
|---|---|
| F | 3.63 mm |
| Fno | 1.17 |
| ω | 38° |

Numerical Example 2

| Unit: mm | | | | |
|---|---|---|---|---|
| Surface data | | | | |
| Surface number | r | d | nd | vd |
| 1* | 12.217 | 0.230 | 1.53 | 56.3 |
| 2* | 3.999 | 3.239 | | |
| 3* | 4.885 | 2.500 | 1.53 | 57.1 |
| 4 | ∞ | 2.551 | 1.53 | 57.1 |
| 5* | −4.934 | 0.050 | | |
| 6* | 5.952 | 1.984 | 1.53 | 57.1 |
| 7* | −16.639 | 2.126 | | |
| 8* | −3.123 | 0.200 | 1.53 | 30.0 |
| 9* | −30.474 | 0.337 | | |
| Image plane | ∞ | | | |

Aspheric data

1st surface
k = 0.000
A2 = 0.000, A4 = 2.619E−04, A6 = 1.540E−05, A8 = 8.507E−06, A10 = 5.916E−08,
A12 = −2.389E−08
2nd surface
k = 0.061
A2 = 0.000, A4 = −2.581E−04, A6 = −4.353E−05, A8 = 5.451E−06, A10 = 3.076E−06,
A12 = 5.267E−08
3rd surface
k = −3.981E−03
A2 = 0.000, A4 = −3.463E−03, A6 = −2.546E−04, A8 = −1.673E−05, A10 = −2.546E−07,
A12 = 2.474E−07
5th surface
K = 0.000
A2 = 0.000, A4 = 4.113E−04, A6 = −1.708E−04, A8 = −2.565E−05, A10 = 8.466E−08,
A12 = 1.321E−06
6th surface
k = 0.000
A2 = 0.000, A4 = −1.013E−03, A6 = 7.391E−04, A8 = −1.597E−04, A10 = −3.815E−05,
A12 = 1.202E−05
7th surface
k = 0.000
A2 = 0.000, A4 = 3.056E−03, A6 = −2.937E−04, A8 = −7.596E−05, A10 = −3.376E−06,
A12 = 4.252E−06
8th surface
k = 0.842
A2 = 0.000, A4 = −8.148E−03, A6 = −2.056E−04, A8 = 5.995E−05, A10 = 2.333E−05,
A12 = 6.343E−06
9th surface
k = 0.000
A2 = 0.000, A4 = 7.904E−03, A6 = −1.777E−03, A8 = 4.417E−05, A10 = 2.590E−05,
A12 = −2.600E−06

| Various data | |
|---|---|
| F | 3.63 mm |
| Fno | 1.17 |
| ω | 38° |

Numerical Example 3

| Unit: mm | | | | |
|---|---|---|---|---|
| Surface data | | | | |
| Surface number | r | d | nd | vd |
| 1* | 11.488 | 0.220 | 1.59 | 29.9 |
| 2* | 4.433 | 1.527 | | |
| 3* | 5.010 | 2.090 | 1.53 | 56.3 |
| 4 | ∞ | 2.100 | 1.53 | 56.3 |
| 5* | −3.760 | 0.042 | | |
| 6* | 6.892 | 1.000 | 1.53 | 57.1 |
| 7* | −15.705 | 0.024 | | |

-continued

| Unit: mm | | | | |
|---|---|---|---|---|
| 8* | 8.549 | 1.047 | 1.53 | 57.1 |
| 9* | −7.953 | 1.241 | | |
| 10* | −3.915 | 0.160 | 1.59 | 29.9 |
| 11* | −80.000 | 0.339 | | |
| Image plane | ∞ | | | |

Aspheric data

1st surface
k = 0.000
A2 = −6.800E−03, A4 = 2.866E−03, A6 = 7.730E−05, A8 = 7.123E−06, A10 = 6.031E−07,
A12 = 2.634E−08
2nd surface
k = 0.000
A2 = 1.055E−03, A4 = −1.805E−03, A6 = −2.578E−05, A8 = 2.924E−05, A10 = 1.280E−06,
A12 = −5.736E−07
3rd surface
k = −12.648
A2 = −3.775E−03, A4 = −5.179E−03, A6 = −1.526E−03, A8 = −3.977E−04, A10 = −3.727E−05,
A12 = 2.297E−05
5th surface
k = −1.584
A2 = −2.705E−03, A4 = −1.024E−03, A6 = −1.380E−04, A8 = 4.881E−06, A10 = 1.706E−05,
A12=1.073E−05
6th surface
k = 0.000
A2 = 6.710E−06, A4 = −5.063E−05, A6 = 8.607E−06, A8 = 1.040E−05, A10 = 2.369E−06,
A12 = −1.259E−06
7th surface
k = 0.000
A2 = −7.865E−03, A4 = −4.201E−03, A6 = −5.913E−04, A8 = −6.098E−05, A10 = −7.227E−06,
A12 = −2.020E−06
8th surface
k = 0.000
A2 = 1.689E−05, A4 = −1.348E−04, A6 = 1.128E−04, A8 = 1.191E−06, A10 = −1.150E−05,
A12 = 2.256E−06
9th surface
k = 0.000
A2 = −2.033E−05, A4 = 3.278E−04, A6 = −7.891E−05, A8 = −2.396E−05, A10 = −4.442E−07,
A12 = 1.758E−06
10th surface
k = 0.661
A2 = −0.160, A4 = −0.037, A6 = 7.012E−03, A8 = 4.418E−05, A10 = −1.821E−04,
A12 = 3.993E−06
11th surface
k = 0.0001
A2 = 9.563E−05, A4 = 5.880E−05, A6 = 5.524E−05, A8 = 4.167E−06, A10 = −4.528E−09,
A12 = −1.678E−07

| Various data | |
|---|---|
| F | 2.88 mm |
| Fno | 1.11 |
| ω | 45 |

Respective values of the parameters are listed below.

| | Example 1 | Example 2 | Example 3 |
|---|---|---|---|
| f | 3.63 | 3.63 | 2.88 |
| FNo. | 1.17 | 1.17 | 1.11 |
| d2 | 4.890 | 5.051 | 4.190 |
| R1 | 3.799 | 4.885 | 5.010 |
| R2 | −4.818 | −4.934 | −3.760 |
| fL1 | −11.40 | −11.30 | −11.17 |
| fL4 | −4.421 | −6.528 | −3.032 |

Respective values of the conditional expressions in the examples are listed below.

| | Example 1 | Example 2 | Example 3 |
|---|---|---|---|
| (1) | 0.6346 | 0.6143 | 0.6193 |
| (2) | 1.0466 | 1.3457 | 1.7396 |
| (3) | −1.3272 | −1.3592 | −1.3056 |
| (4) | −0.3185 | −0.3212 | −0.2578 |
| (5) | −0.8211 | −0.5561 | −0.9499 |

Although the embodiments of the present invention have been described above, the present invention is not limited to these embodiments, and various modifications and changes can be made within the scope of the gist thereof.

INDUSTRIAL APPLICABILITY

The present invention is suitable for a wide-angle lens that has high imaging performance and has a sufficiently short length of not only the object-side optical path but also the image-side optical path.

EXPLANATION OF REFERENCE NUMERALS

G1 First lens group
G2 Second lens group
G3 Third lens group
G4 Fourth lens group
L1, L2, L3, L4 Lens
P Optical element
r1 First optical surface
r2 Second optical surface
r3 Third optical surface
I Image plane

What is claimed is:
1. A wide-angle lens consisting of:
a first lens group comprising a lens having a negative refractive power as a whole,
a second lens group including an optical element,
a third lens group comprising up to two lenses having a positive refractive power and
a fourth lens group comprising one lens having a negative refractive power in order of an optical path from an object side,
wherein the first lens group includes a meniscus lens having a negative refractive power and a convex surface facing the object side,
the optical element has, in the order of the optical path, a first optical surface that is convex toward the object side, a second optical surface that bends the optical path from the first optical surface and a third optical surface that is concave toward the object side, and
the first optical surface, the second optical surface and the third optical surface are integrally molded,
wherein the wide-angle lens has six or more aspherical surfaces in total, and
wherein four or more aspherical surfaces are rotationally symmetrical aspherical surfaces.
2. The wide-angle lens as claimed in claim 1, wherein the first lens group consists of the meniscus lens having the negative refractive power having the convex surface facing the object side.
3. The wide-angle lens as claimed in claim 1, wherein all lenses and the optical element constituting each lens group are made of plastic.
4. The wide-angle lens as claimed in claim 1, wherein the wide-angle lens satisfies the conditional expressions (2) and (3)

$$0.9 < R1/f < 2.1 \qquad (2)$$

$$-1.9 < R2/f < -0.9 \qquad (3)$$

here,
R1 is a radius of curvature of an object side surface of the second lens group,
R2 is a radius of curvature of an image side surface of the second lens group, and
f is a focal length of the entire wide-angle lens.

5. The wide-angle lens as claimed in claim 1, wherein the wide-angle lens satisfies the following conditional expression (4)

$$-0.55 < f/fL1 < -0.15 \qquad (4)$$

here,
f is a focal length of the entire wide-angle lens, and
fL1 is a focal length of the first lens group.
6. A wide-angle lens consisting of:
a first lens group comprising a lens having a negative refractive power as a whole,
a second lens group including an optical element,
a third lens group comprising up to two lenses having a positive refractive power and
a fourth lens group comprising one lens having a negative refractive power in order of an optical path from an object side,
wherein the first lens group includes a meniscus lens having a negative refractive power and a convex surface facing the object side,
the optical element has, in the order of the optical path, a first optical surface that is convex toward the object side, a second optical surface that bends the optical path from the first optical surface and a third optical surface that is concave toward the object side, and
the first optical surface, the second optical surface and the third optical surface are integrally molded,
wherein the wide-angle lens has six or more aspherical surfaces in total, and
wherein the wide-angle lens satisfies the following conditional expression (1)

$$0.35 < f/(FNo \times d2) < 1.0 \qquad (1)$$

here,
f is a focal length of the entire wide-angle lens,
FNo is an F number of the wide-angle lens, and
d2 is a thickness of the entire second lens group on an optical axis.
7. A wide-angle lens consisting of:
a first lens group comprising a lens having a negative refractive power as a whole,
a second lens group including an optical element,
a third lens group comprising up to two lenses having a positive refractive power and
a fourth lens group comprising one lens having a negative refractive power in order of an optical path from an object side,
wherein the first lens group includes a meniscus lens having a negative refractive power and a convex surface facing the object side,
the optical element has, in the order of the optical path, a first optical surface that is convex toward the object side, a second optical surface that bends the optical path from the first optical surface and a third optical surface that is concave toward the object side, and
the first optical surface, the second optical surface and the third optical surface are integrally molded,
wherein the wide-angle lens has six or more aspherical surfaces in total, and wherein the wide-angle lens satisfies the following conditional expression (5)

$$-0.80 < f/fL4 < -0.15 \qquad (5)$$

here, f is a focal length of the entire wide-angle lens, and fL4 is a focal length of the fourth lens group.

\* \* \* \* \*